United States Patent
Chen et al.

(10) Patent No.: US 7,740,382 B2
(45) Date of Patent: Jun. 22, 2010

(54) LIGHT SOURCE MODULE INCLUDING LIGHT CONVERGING ELEMENT

(75) Inventors: Hui-Ping Chen, Hsinchu (TW); Tien-Chia Liu, Hsinchu (TW); Chih-Lu Hsu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 156 days.

(21) Appl. No.: 11/934,907

(22) Filed: Nov. 5, 2007

(65) Prior Publication Data
US 2008/0239717 A1   Oct. 2, 2008

(30) Foreign Application Priority Data
Mar. 28, 2007   (TW) ............... 96110723 A

(51) Int. Cl.
F21V 7/04 (2006.01)
F21V 5/04 (2006.01)

(52) U.S. Cl. .................. 362/300; 362/327; 362/307; 362/311.01; 313/498; 313/512

(58) Field of Classification Search ............ 362/300, 362/307, 310, 311.01, 311.07, 311.06, 311.11, 362/311.15, 327; 313/498, 512
See application file for complete search history.

(56) References Cited

U.S. PATENT DOCUMENTS

| | | | |
|---|---|---|---|
| 4,992,704 A * | 2/1991 | Stinson | 315/312 |
| 5,757,557 A * | 5/1998 | Medvedev et al. | 359/708 |
| 6,726,329 B2 | 4/2004 | Li et al. | |
| 6,819,505 B1 * | 11/2004 | Cassarly et al. | 359/726 |
| 7,401,948 B2 * | 7/2008 | Chinniah et al. | 362/326 |
| 2004/0004675 A1 | 1/2004 | Honda | |
| 2005/0179041 A1 | 8/2005 | Harbers et al. | 257/80 |
| 2005/0248732 A1 | 11/2005 | Tomita | |
| 2006/0227302 A1 | 10/2006 | Harbers et al. | 353/94 |

FOREIGN PATENT DOCUMENTS

CN    1404630    3/2003

OTHER PUBLICATIONS

Chinese Examination Report of Taiwan Application No. 096110723, dated on Feb. 26, 2010.

* cited by examiner

*Primary Examiner*—Ismael Negron
(74) *Attorney, Agent, or Firm*—J.C. Patents

(57) ABSTRACT

A light source assembly provides an illumination beam and the light converging element is disposed on a transmission path of the illumination beam. A light converging element has a top end and a bottom end opposite to the top end. The light converging element is gradually reduced from the bottom end to the top end. The top end is opposite to the light source assembly and has a cavity. The illumination beam is incident into the light converging element from the cavity and exits the light converging element from the bottom end.

10 Claims, 10 Drawing Sheets

LIGHT SOURCE MODULE INCLUDING LIGHT CONVERGING ELEMENT

CROSS-REFERENCE TO RELATED APPLICATION

This application claims the priority benefit of Taiwan application serial no. 96110723, filed Mar. 28, 2007. All disclosure of the Taiwan application is incorporated herein by reference.

BACKGROUND OF THE INVENTION

1. Field of the Invention

The present invention relates to a light source module. More particularly, the present invention relates to a light source module using a semiconductor light source.

2. Description of Related Art

Referring to FIG. 1A, a conventional projection apparatus 100 includes a light source module 110, a polarization beam splitter 120, a liquid crystal on silicon panel (LCOS panel) 130, and a projection lens 140. The light source module 110 is used to provide an illumination beam 112, and the polarization beam splitter 120 is disposed on a transmission path of the illumination beam 112. The polarization beam splitter 120 has a beam splitting surface 122. A P-polarization light 112$p$ of the illumination beam 112 passes through the beam splitting surface 122 and an S-polarization light 112$s$ of the illumination beam 112 is reflected by the beam splitting surface 122 to the LCOS panel 130. The LCOS panel 130 is used to convert the S-polarization light 112$s$ into an image beam 112' with the P-polarization, and the image beam 112' is reflected by the LCOS panel 130 to the projection lens 140. The projection lens 140 is used to project the image beam 112' onto a screen (not shown), so as to display an image on the screen.

The light source module 110 includes an integration rod 114 and a light source assembly 116. The light source assembly 116 includes a plurality of light emitting diodes (LEDs) 116$a$. The integration rode 114 is used to uniform the illumination beam 112 emitted by the LEDs 116$a$, such that the brightness of the image projected by the protection apparatus 100 is relatively uniform.

Referring to FIG. 1B, a diverging angle θ of the illumination beam 112 provided by the LED 116$a$ is relatively large, and the integration rod 114 does not have a light converging function, so the diverging angle of the illumination beam 112 after passing through the integration rod 114 may not be reduced. In other words, the diverging angle of the illumination beam 112 provided by the conventional light source module 110 is relatively large, so the light utilization efficiency is relatively low, and the brightness of the image projected by the protection apparatus 100 is reduced.

SUMMARY OF THE INVENTION

Accordingly, the present invention is directed to a light source module for providing an illumination beam with a relatively small diverging angle.

A light source module provided by the present invention includes a light source assembly and a light converging element. The light source assembly is suitable to provide an illumination beam, and the light converging element is disposed on a transmission path of the illumination beam. The light converging element has a top end and a bottom end opposite to the top end, and the light converging element is gradually reduced from the bottom end to the top end. The top end is opposite to the light source assembly and has a cavity. The illumination beam is incident into the light converging element from the cavity and exits the light converging element from the bottom end.

The light converging element is gradually reduced from the bottom end to the top end. After the illumination beam is incident into the light converging element from the cavity, the illumination beam with a larger diverging angle is reflected and converged by a side surface between the top end and the bottom end, so the diverging angle of the illumination beam after exiting from the bottom end is reduced. Therefore, the light source module of the present invention provides the illumination beam with a smaller diverging angle.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "right," "left," etc., is used with reference to the orientation of the Figure(s) being described. The components of the present invention may be positioned in a number of different orientations. As such, the l directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "surrounded," and variations thereof herein are used broadly and encompass direct and indirect surroundings. Accordingly, the drawings and descriptions will be regarded as illustrative in nature and not as restrictive.

Figure 1A:
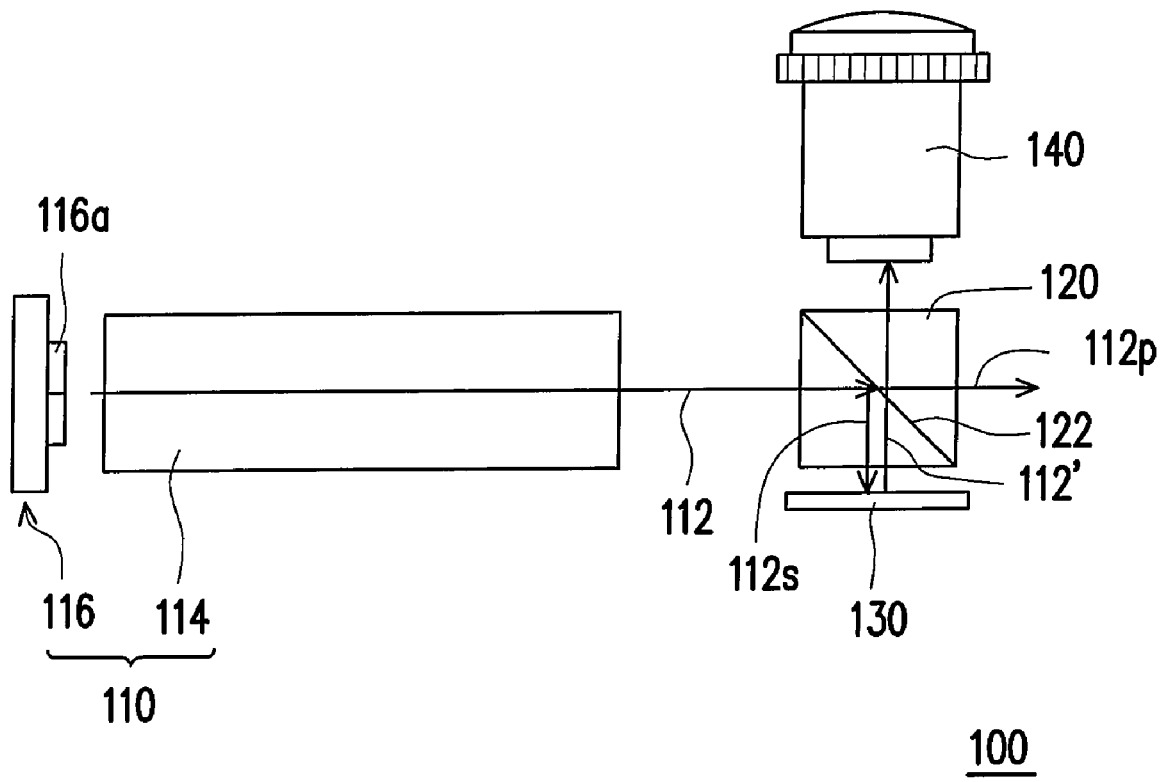
FIG. 1A is a schematic view of a conventional projection apparatus.
Figure 1B:
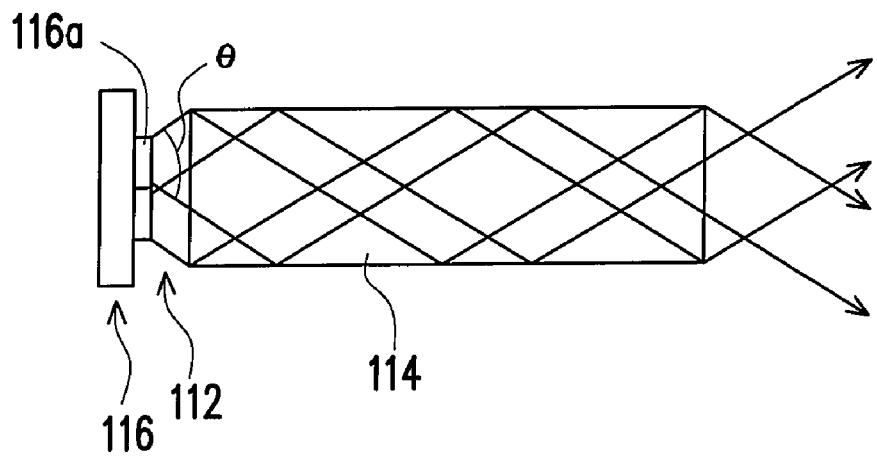
FIG. 1B is a schematic view of the diverging of an illumination beam in FIG. 1A.
Figure 2A:
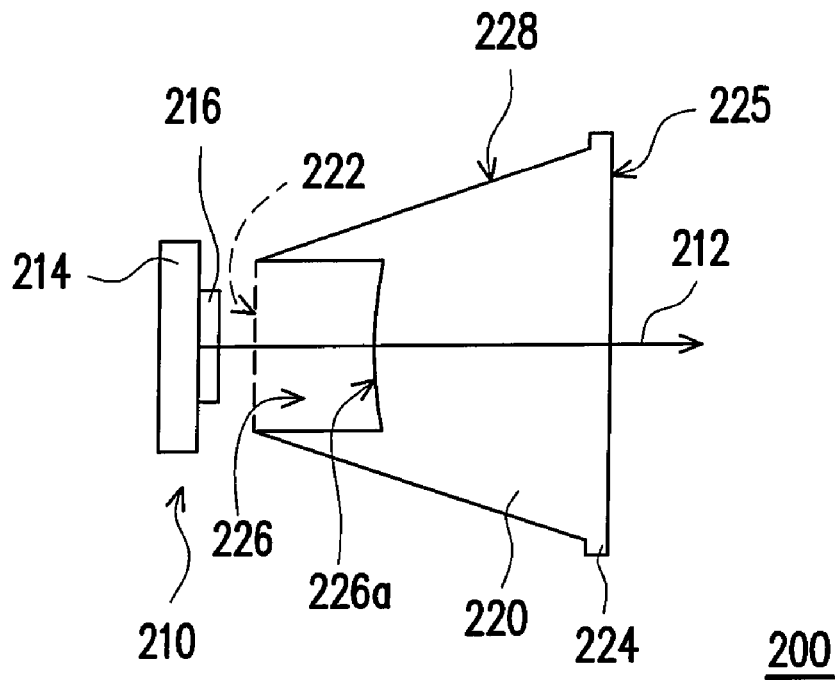
FIG. 2A is a schematic cross-sectional view of a light source module according to an embodiment of the present invention.
Figure 2B:
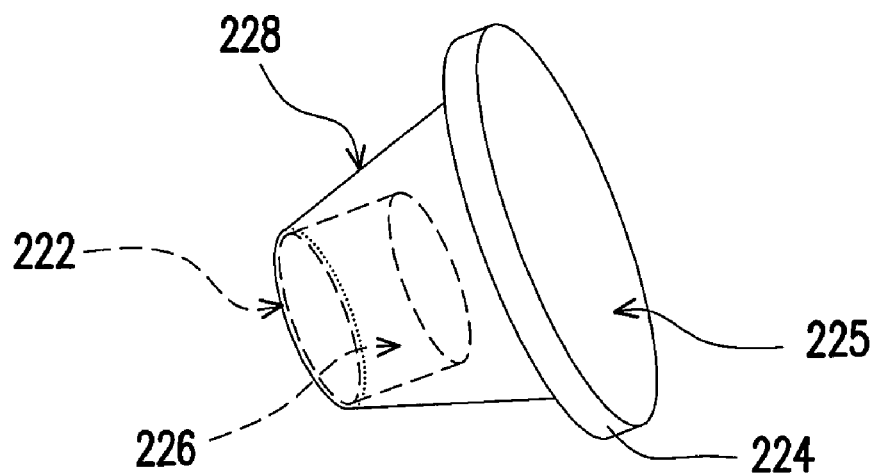
FIG. 2B is a perspective view of a light converging element in FIG. 2A.
Figure 2C:
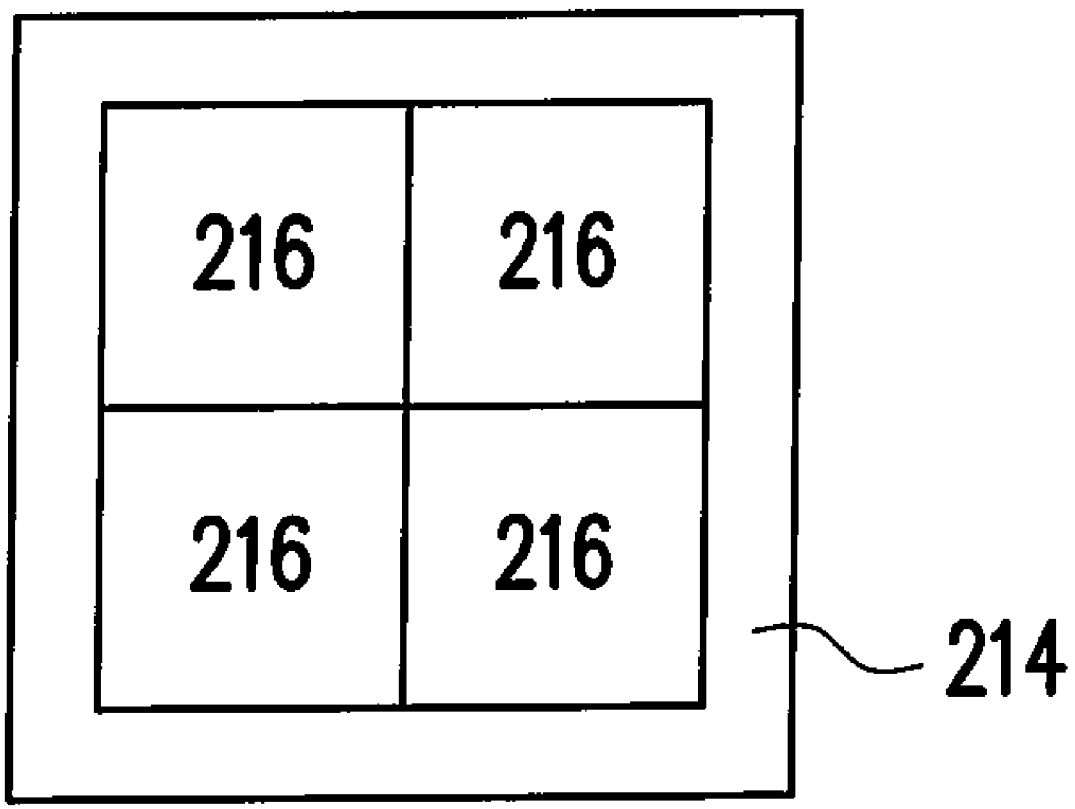
FIG. 2C is a schematic view of a light source assembly in FIG. 2A.

Referring to FIGS. 2A to 2C, a light source module 200 of an embodiment of the present invention includes a light source assembly 210 and a light converging element 220. The light source assembly 210 is suitable to provide an illumination beam 212, and the light converging element 220 is disposed on a transmission path of the illumination beam 212. The light converging element 220 has a top end 222 and a bottom end 224 opposite to the top end 222, and the light converging element 220 is gradually reduced from the bottom end 224 to the top end 222. The top end 222 is opposite to the light source assembly 210 and has a cavity 226. The illumination beam 212 is firstly transmitted in the air, then is incident into the light converging element 220 from the cavity 226, and exits from the bottom end 224.

The light source assembly 210 includes a carrier 214 and at least one semiconductor light source 216, for example, four semiconductor light sources 216 in the embodiment, disposed on the carrier 214. The semiconductor light sources 216 may be LEDs, lasers, or other semiconductor light sources, and the colors of the semiconductor light sources 216 may be different. For example, the colors of the semiconductor light sources 216 include red, blue, and green. In addition, the material of the light converging element 220 may be plastic or glass, and the refractivity of the light converging element 220 is larger than that of the air. The cavity 226 is, for example, a circular cavity, and the bottom 226a of the cavity 226 may be a convex surface. The bottom end 224 of the light converging element 220 has a plane surface 225, and the contours of the top end 222 and the bottom end 224 of the light converging element 220 are, for example, circular. In addition, the light converging element 220 is gradually reduced from the bottom end 224 to the top end 222, so a side surface 228 of the light converging element 220 is an inclined surface.

Figure 3:
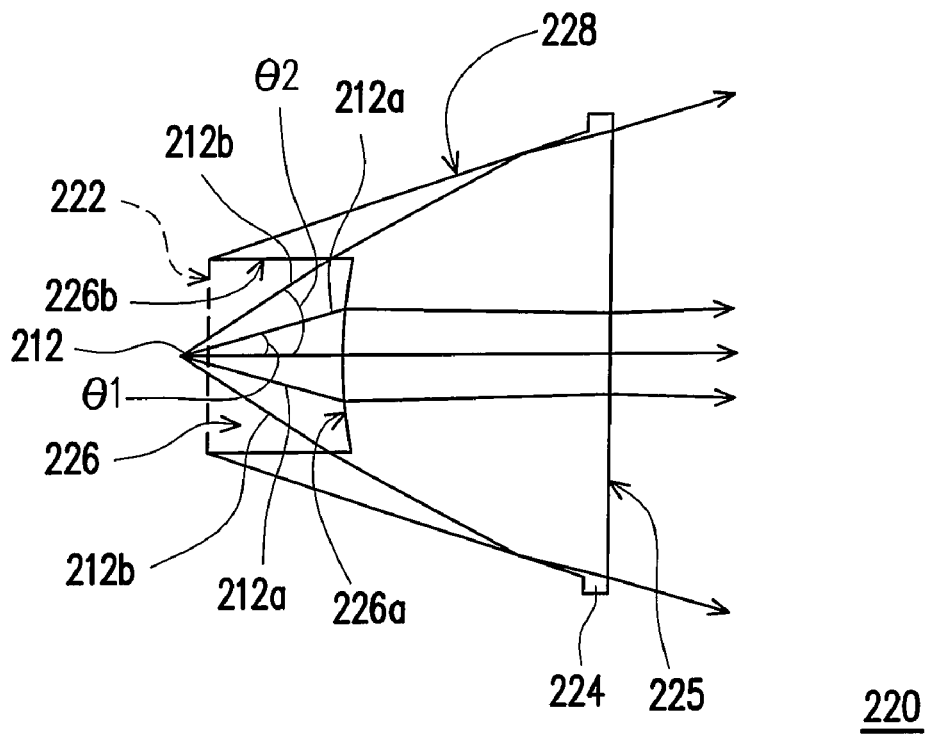
FIG. 3 is a schematic view of a transmission path of an illumination beam in the light converging element of FIG. 2A.

Referring to FIG. 3, in the illumination beam 212 provided by the light source assembly 210, light rays with smaller diverging angle (for example, the light rays 212a with the diverging angle of θ1) are incident into the light converging element 220 from the bottom 226a of the cavity 226. The refractivity of the light converging element 220 is larger than that of the air, and the bottom 226a is a convex surface with light converging function, so the light rays 212a incident from the bottom 226a may be effectively converged by the light converging element 220.

In addition, the light rays with larger diverging angle (for example, the light rays 212b with the diverging angle of θ2) are incident into the light converging element 220 from the side wall 226b of the cavity 226. The refractivity of the light converging element 220 is larger than that of the air, so the light rays 212b incident from the side wall 226b are firstly converged. Then, the light rays 212b are transmitted to the side surface 228 of the light converging element 220. In the embodiment, a slope of the side surface 228 is designed to allow the incident angle of the light rays 212b incident into the side surface 228 to be larger than the total reflection angle, so the light rays 212b are reflected and converged by the side surface 228.

The illumination beam 212 may be converged by the light converging element 220, so that the diverging angle of the illumination beam 212 after passing through the light converging element 220 becomes smaller. Therefore, the light utilization efficiency is improved by applying the light source module 220 in the projection apparatus.

Figure 4:
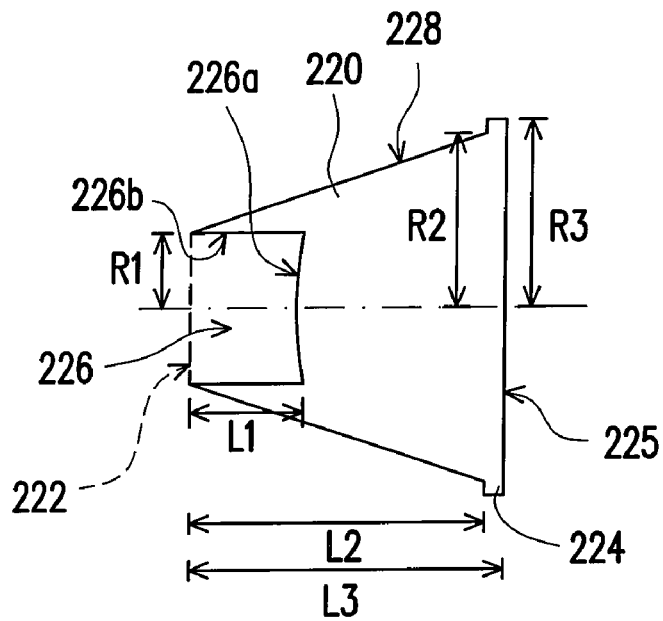
FIG. 4 is a schematic cross-sectional view of the light converging element of FIG. 2A.

Referring to FIGS. 2A and 4, in the embodiment, the size and the refractive index of the selected material of the light converging element 220 may be designed according to the light source assembly 210 and the converging angle of the illumination beam 212. The size of the light converging element 220 includes a radius R1 of the cavity 226 (i.e. the radius R1 of the circular contour of the top end 222), a radius R2 of the circular contour formed at the junction of the side surface 228 and the bottom end 224, a radius R3 of the plane surface 225 of the bottom end 224, a length L1 of the side wall 226b, and distances L2 and L3 from the top end 222 to the two surfaces of the bottom end 224.

Figure 5A:
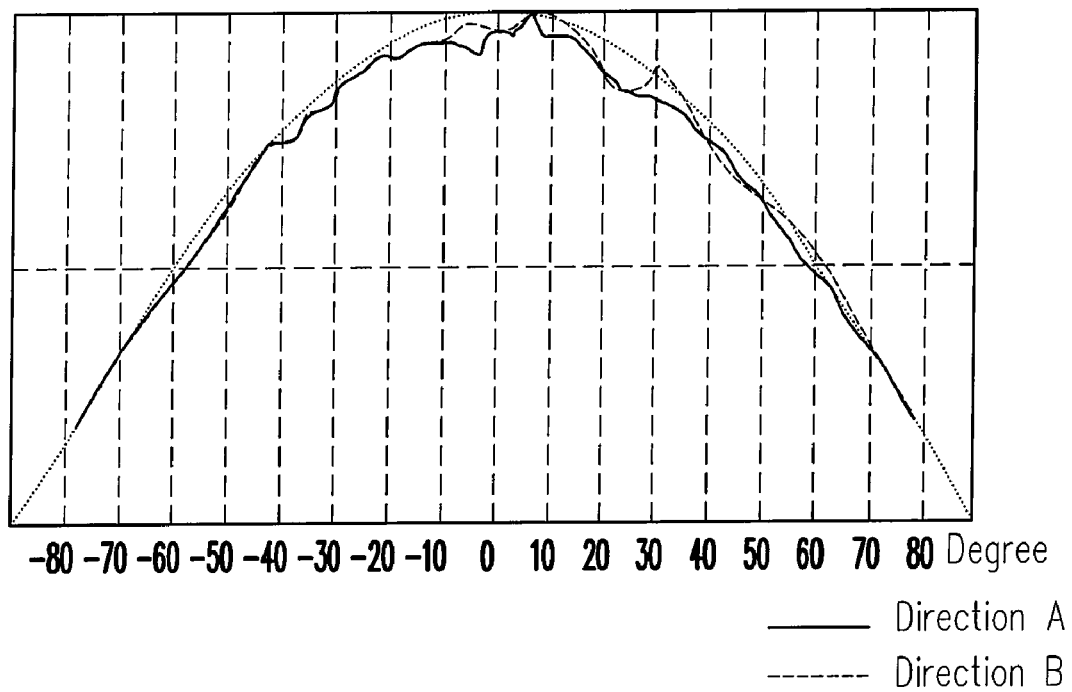
FIG. 5A is a diagram of an angle distribution of the illumination beam before passing through the light converging element.
Figure 5B:
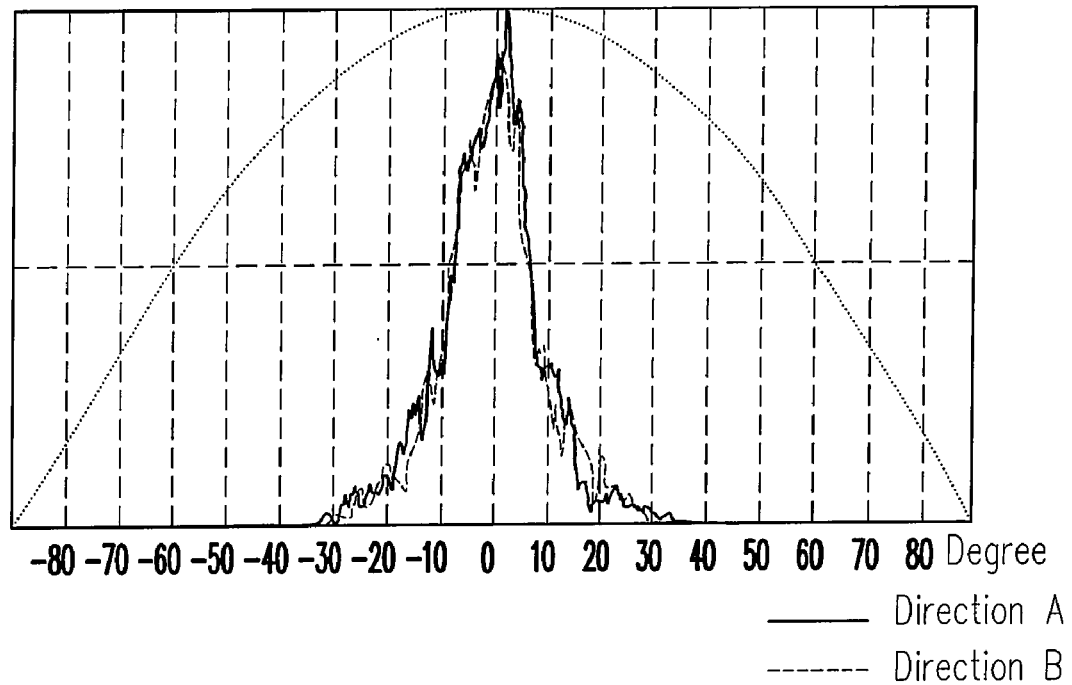
FIG. 5B is a diagram of the angle distribution of the illumination beam after passing through the light converging element.

FIG. 5A is a diagram of an angle distribution of the illumination beam before passing through the light converging element, and FIG. 5B is a diagram of the angle distribution of the illumination beam after passing through the light converging element. It should be firstly made clearly that for the light converging element 220 used in testing, R1=2.2 mm, R2=6.5 mm, R3=7.5 mm, L1=5 mm, L2=8.5 mm, L3=10 mm. The refractive index is 1.49, the material of the light converging element 220 is polymethyl methacrylate (PMMA), and the bottom 226a is a curved surface with a curvature radius of 3.01 mm. It can be seen from FIG. 5A that the angle distribution of the illumination beam 212 before passing through the light converging element 220 is approximately between +80 and −80 degrees. The main angle distribution of the illumination beam 212 after passing through the light converging element 220 is approximately between +20 and −20 degrees (as shown in FIG. 5B). In other words, the large intensity of the illumination beam 212 after passing through the light converging element 220 is distributed within an angle range of smaller than 40 degrees. Therefore, the illumination beam 212 may be effectively converged by the light converging element 220 of the embodiment.

Figure 6A:
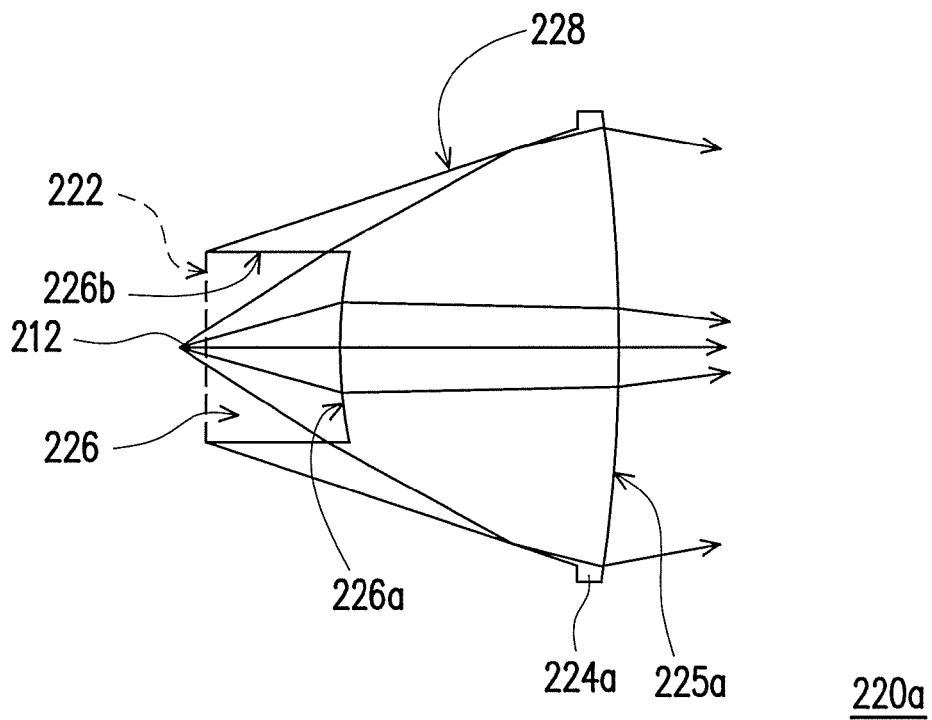
FIGS. 6A to 6C are schematic cross-sectional views of light converging elements according to another three embodiments of the present invention.
Figure 6B:
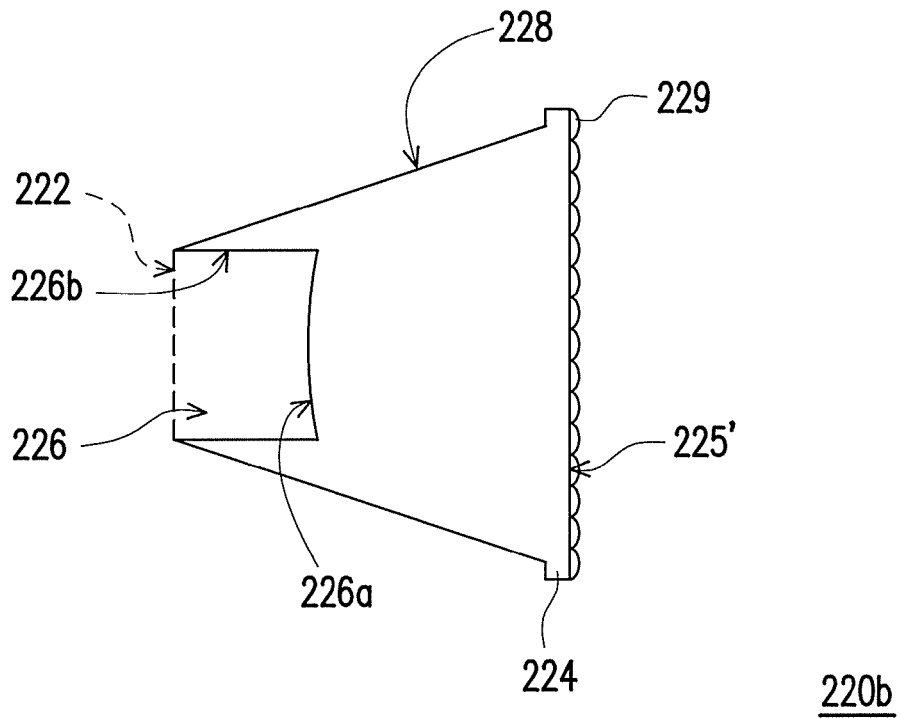
Figure 6C:
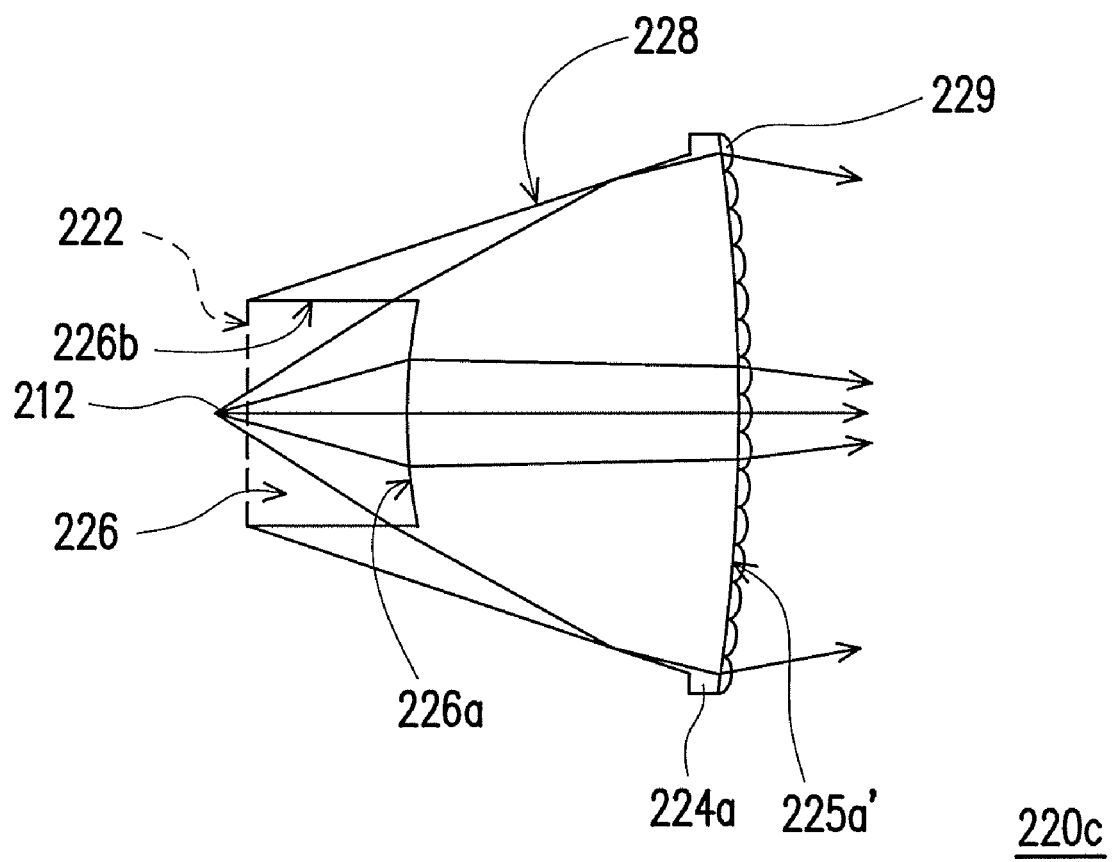

Referring to FIG. 6A, the light converging element 220a is similar to the light converging element 220 of FIG. 3 except the following differences. The bottom end 224 of the light converging element 220 has a plane surface 225, and the bottom end 224a of the light converging element 220a has a convex surface 225a, so that the illumination beam 212 exiting from the bottom end 224a may be converged. In addition, in order to make the illumination beam 212 exiting from the bottom end 224a further converged, as shown in the light converging element 220b of FIG. 6B, a plurality of micro-lenses 229 are disposed on the plane surface 225' of the light converging element 220b, and as shown in the light converging element 220c of FIG. 6C, a plurality of micro-lenses 229 are disposed on the convex surface 225a' of the light converging element 220c.

Figure 7A:
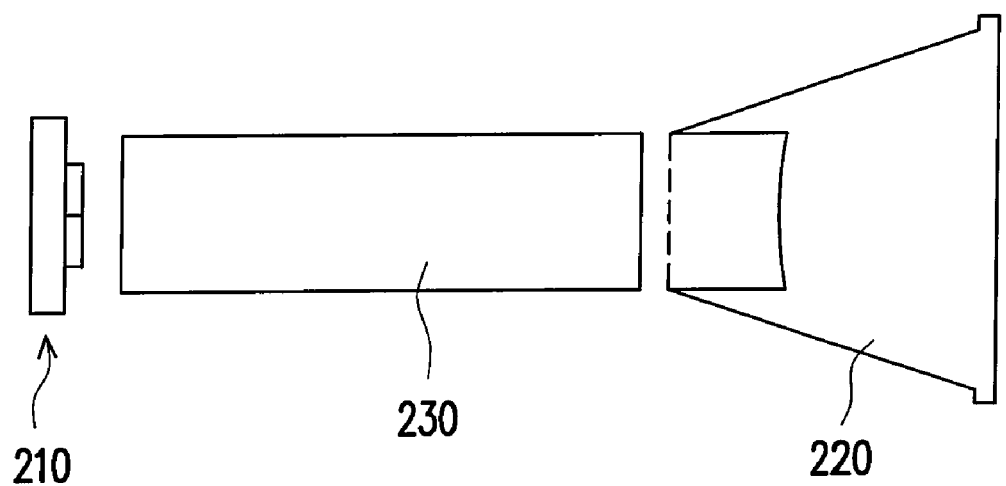
FIGS. 7A to 7D are schematic cross-sectional views of light source modules according to another four embodiments of the present invention.
Figure 7B:
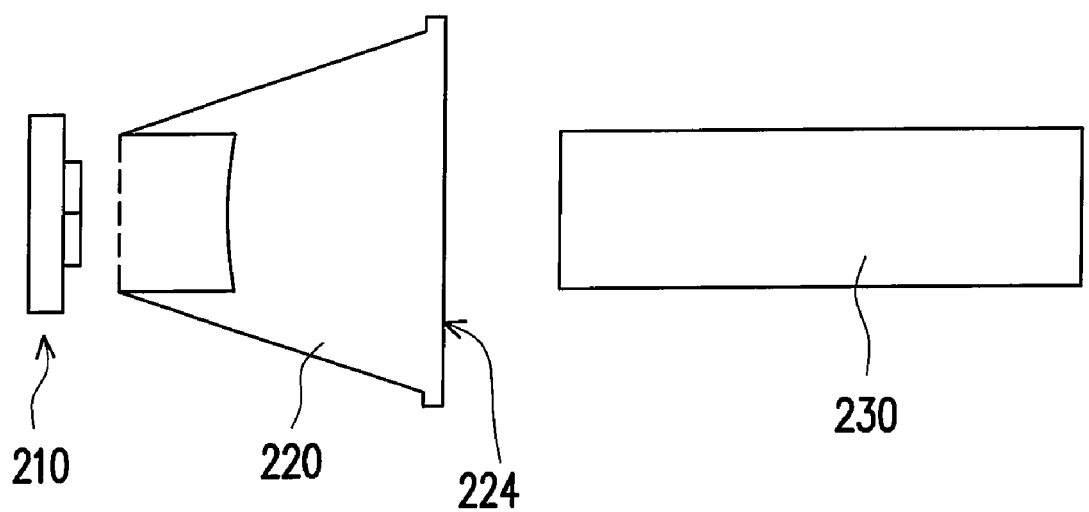
Figure 7C:
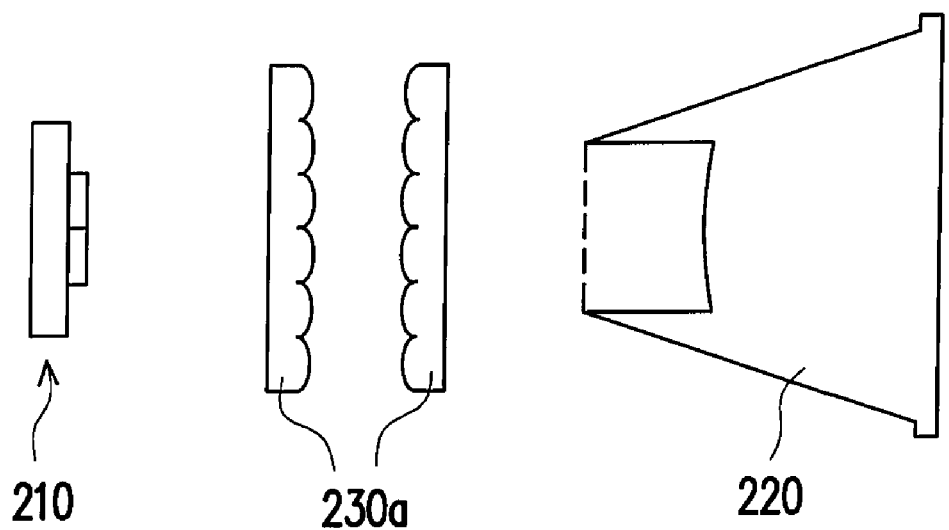
Figure 7D:
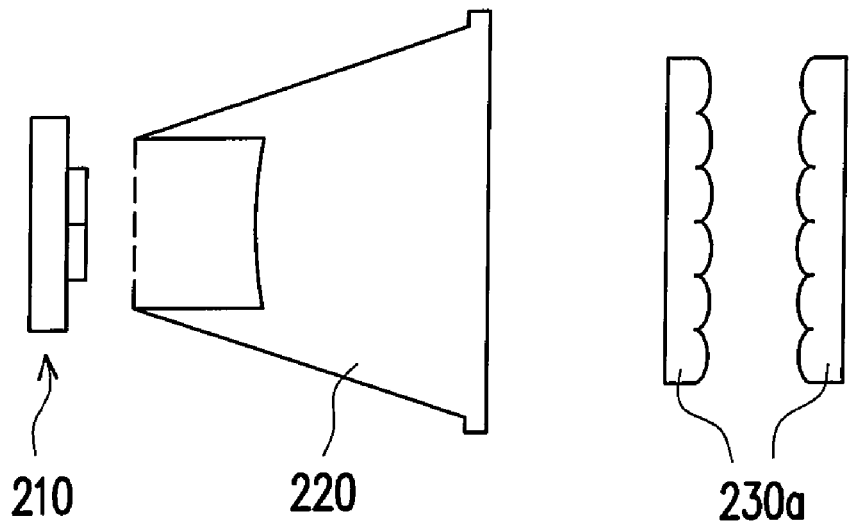

Referring to FIG. 7A, compared with the light source module 200 of FIG. 2A, the light source module 200a further includes a light uniforming element 230 disposed between the light source assembly 210 and the light converging element 220. The light uniforming element 230 is, for example, an integration rod, and the integration rod may be a solid or a hollow integration rod. In addition, the light uniforming element 230 may also be disposed beside the bottom end 224 of the light converging element 220 (as shown in FIG. 7B). The illumination beam is firstly converged by the light converging element 220, so most of the illumination beam may enter the light uniforming element 230, thereby reducing the loss of light and improving the light utilization efficiency. In addition, referring to FIGS. 7C and 7D, in the present invention, a lens array 230a may be used as the light uniforming element.

Figure 8:
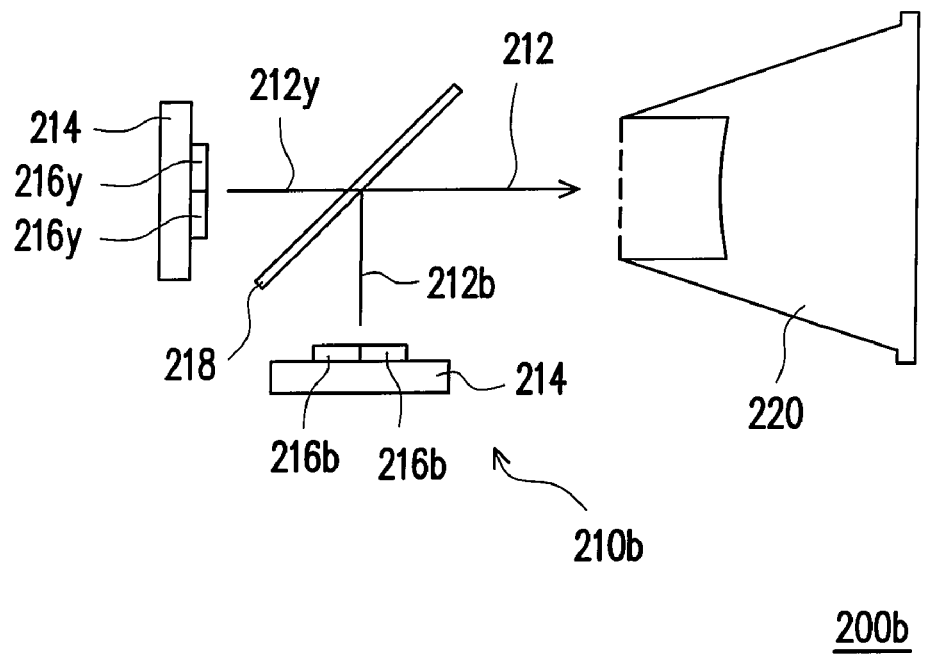
FIG. 8 is a schematic cross-sectional view of a light source module according to another embodiment of the present invention.

Referring to FIG. 8, the light source module 200b of the embodiment is different from the light source module 200 of FIG. 2 in terms of the light source assembly. The light source assembly 210b includes at least one first semiconductor light source 216b, at least one second semiconductor light source 216y, and a light combination unit 218. The first semiconductor light source 216b is disposed on a carrier 214, and the second semiconductor light source 216y is disposed on another carrier 214. The first semiconductor light source 216a is suitable to provide a first color light beam 212b (e.g. blue light beam), and the second semiconductor light source 216y is suitable to provide a second color light beam 212y (e.g. yellow light beam). The colors of the first color light beam 212b and the second color light beam 212y are complementary. For example, in the embodiment, the blue light beam and the yellow light beam may be mixed into a white light beam. The light combination unit 218 is, for example, a dichroic mirror, disposed on transmission paths of the first color light beam 212b and the second color light beam 212y. The first color light beam 212b is reflected by the light combination unit 218 and the second color light beam 212y passes through the light combination unit 218, such that the first color light beam 212b and the second color light beam 212y are combined into the illumination beam 212.

Figure 9:
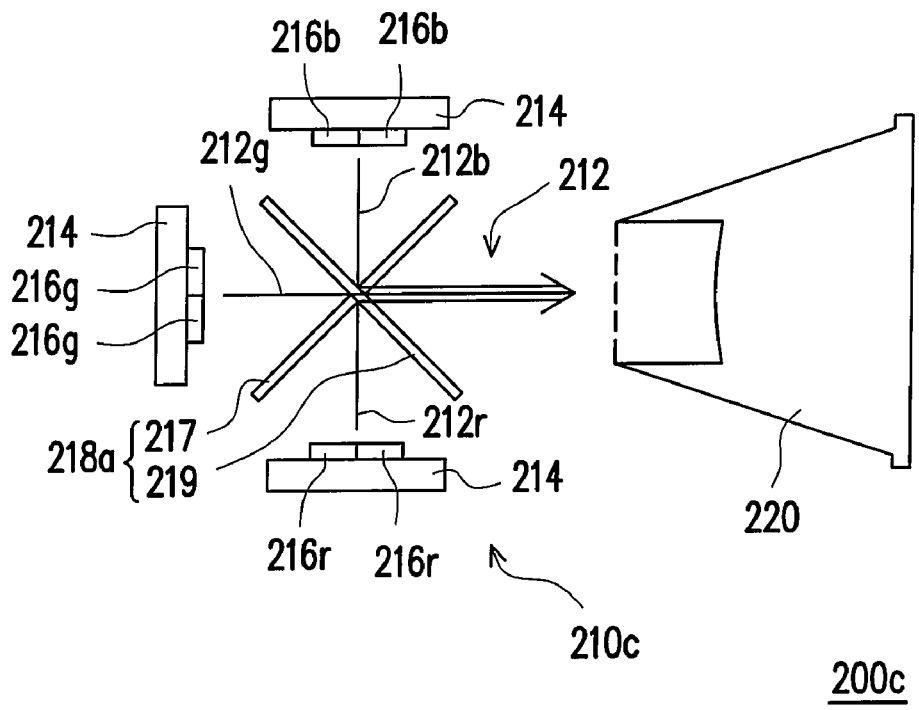
FIG. 9 is a schematic cross-sectional view of a light source module according to yet another embodiment of the present invention.

Referring to FIG. 9, the light source module 200c of the embodiment is different from the light source module 200 of FIG. 2 in terms of the light source assembly. The light source assembly 210c includes at least one first semiconductor light source 216r, at least one second semiconductor light source 212g, at least one third semiconductor light source 216b, and a light combination unit 218. Each of the semiconductor light sources is respectively disposed on a carrier 214. The first semiconductor light source 216r is suitable to provide a first color light beam 212r (e.g. red light beam), the second semiconductor light source 216g is suitable to provide a second color light beam 212g (e.g. green light beam), and the third semiconductor light source 216b is suitable to provide a third color light beam 212b (e.g. blue light beam). In the embodiment, the light combination unit 218a of the light source module 200c includes two crossed dichroic mirrors 217, 219. The first semiconductor light source 216r, the second semiconductor light source 216g, and the third semiconductor light source 216b of the light source module 200c are disposed on different carriers 214. The first color light beam 212r is reflected by the dichroic mirror 217, and the second color light beam 212g and the third color light beam 212b passes through the dichroic mirror 217. The third color light beam 212b is reflected by the dichroic mirror 219, and the second color light beam 212g and the first color light beam 212r passes through the dichroic mirror 219, such that the first color light beam 212r, the second color light beam 212g, and the third color light beam 212b are combined into the illumination beam 212.

To sum up, the light source module of the present invention at least includes one or more of the following advantages.

1. The bottom of the cavity of the light converging element converges the light rays with smaller diverging angles, and the light rays with larger diverging angles are reflected by the side surface of the light converging element, so the diverging angle of the illumination beam exiting from the bottom end is reduced. Therefore, the light source module of the present invention may provide the illumination beam with smaller diverging angle.

2. The bottom end of the light converging element is designed to be the convex surface or a plurality of microlenses are disposed on the bottom end, so that the illumination beam may be further converged.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a light source assembly, for providing an illumination beam;
a light converging element, disposed on a transmission path of the illumination beam, the light converging element having a top end and a bottom end opposite to the top end, and being gradually reduced from the bottom end to the top end, wherein the top end is opposite to the light source assembly and has a cavity, the bottom of the cavity has a convex surface, and the illumination beam is incident into the light converging element from the cavity and exits the light converging element from the bottom end, wherein an angle distribution of the illumination beam after passing through the light converging element is smaller than 40 degrees; and a light uniforming element disposed between the light converging element and the light source assembly or disposed beside the bottom end of the light converging element.

2. The light source module as claimed in claim 1, wherein contours of the top end and the bottom end are circular, and the cavity is a circular cavity.

3. The light source module as claimed in claim 1, wherein the bottom end of the light converging element has a convex surface.

4. The light source module as claimed in claim 3, wherein the convex surface has a plurality of micro-lenses disposed thereon.

5. The light source module as claimed in claim 1, wherein the bottom end of the light converging element has a plane surface.

6. The light source module as claimed in claim 5, wherein the plane surface has a plurality of micro-lenses disposed thereon.

7. The light source module as claimed in claim 1, wherein the light source assembly comprises at least one semiconductor light source.

8. The light source module as claimed in claim 7, wherein the semiconductor light source is a light emitting diode (LED) or a laser.

9. The light source module as claimed in claim 1, wherein the light source assembly comprises:
   at least one first semiconductor light source, for providing a first color light beam;
   at least one second semiconductor light source, for providing a second color light beam; and
   a light combination unit, disposed on transmission paths of the first color light beam and the second color light beam to combine the first color light beam and the second color light beam into the illumination beam.

10. The light source module as claimed in claim 9, wherein the light source assembly further comprises at least one third semiconductor light source for providing a third color light beam, the light combination unit is disposed on a transmission path of the third color light beam to combine the first color light beam, the second color light beam and the third color light beam into the illumination beam.

* * * * *